Aug. 15, 1967
R. E. SEEKINS
3,335,607
LIQUID LEVEL SIGHT GLASS DEVICE
Filed March 2, 1965
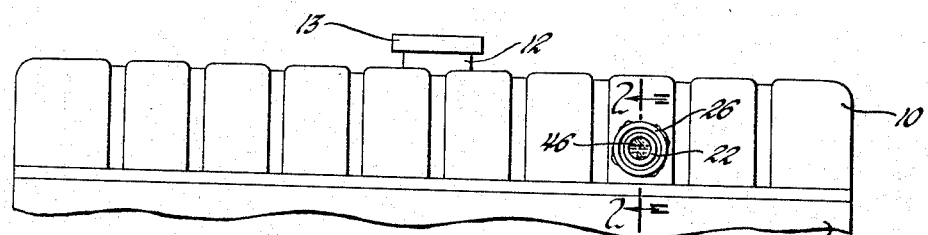
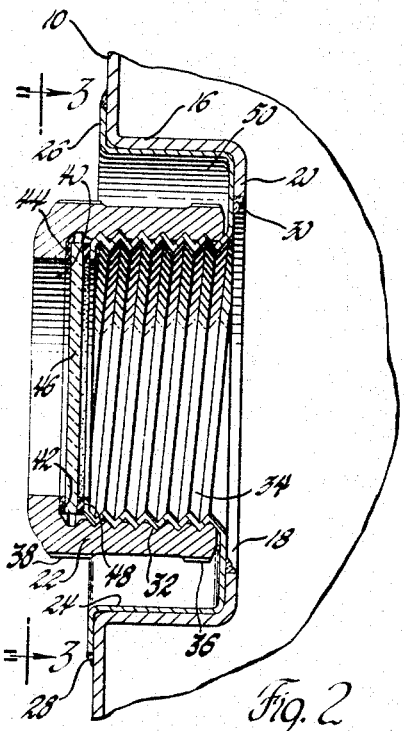
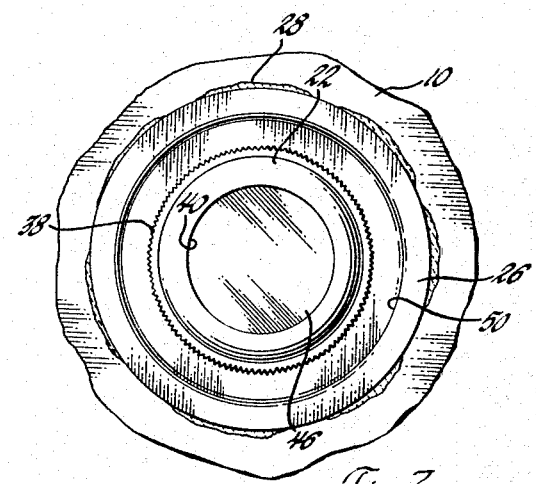
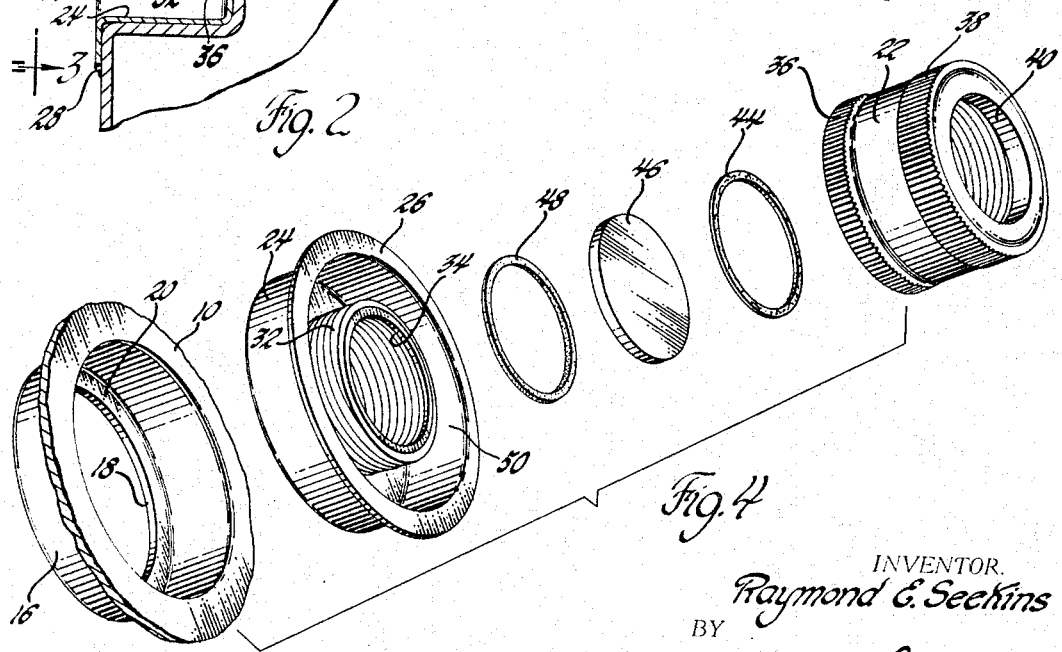
INVENTOR.
Raymond E. Seekins
BY
George E. Johnson
ATTORNEY 3,335,607
LIQUID LEVEL SIGHT GLASS DEVICE
Raymond E. Seekins, Lockport, N.Y., assignor to General Motors Corporation, Detroit, Mich., a corporation of Delaware
Filed Mar. 2, 1965, Ser. No. 436,487
1 Claim. (Cl. 73—334)

ABSTRACT OF THE DISCLOSURE

A recessed window arrangement for viewing liquid in a thin walled receptacle such as an automobile radiator.

This invention relates to liquid level indicating devices and more particularly to devices adapted to be attached to tanks such as the top tank of an automobile radiator and by means of which the liquid level in such a tank may be visually observed.

Tanks such as automobile radiator header tanks are generally made of very light sheet metal and, although it would appear obvious to apply a window to a tank wall if it be desirous to see the contents, provision must be made for cleaning the interior of the tank window or sight glass, the structure must be sturdy and leakproof despite vibrations and jolts to which the light metal wall will be subjected, and it should be saving of space, low in cost as well as easy to fabricate.

An object of the present invention is to provide an improved sight glass device for a thin walled liquid container such as an automobile radiator header tank.

A feature of the present invention is a sight glass device including a light permeable element detachably retained in fluid tight relation between two members, one of which is of thin material and which has a flange at its periphery to serve as a support, and the two members defining a channel open in the plane of the flange. Another feature is a tank having an improved level indicating device inserted in a vertical thin wall portion thereof, one member of the device being conveniently detachable for cleaning so that the effectiveness of the device may be maintained.

Other features of the invention will become apparent and understandable as the description proceeds.

In the drawings:

FIGURE 1 is an elevational view of a head tank and a core portion of an automobile radiator;

FIGURE 2 is an enlarged sectional view looking in the direction of the arrows 2—2 in FIGURE 1;

FIGURE 3 is an elevational view looking in the direction of the arrows 3—3 in FIGURE 2; and FIGURE 4 is an exploded view of a portion of a tank wall and elements of the sight glass device shown in FIGURES 1, 2, and 3.

The device disclosed herein is referred to as including a window or sight glass element. It should be understood, however, that this terminology is intended to include any light permeable element material through which the presence of a liquid level may be observed. The window could be of a translucent material and in certain installations it could be of plastic instead of being made of glass. Also, it is sometimes advisable to use a glass having heat resisting characteristics.

In FIGURE 1 of the drawings, a radiator header tank is depicted at 10 and such a header tank conventionally has a filler neck such as the filler neck 12 and they are generally made to communicate with a core indicated at 14. A removable cap 13 is retained on the neck as conventional automobile radiators are subjected to considerable internal pressure. One wall of the tank 10 is made of thin sheet metal and is indented as shown at 16 to form a cup-like recess. That portion of the wall that forms the recess is centrally apertured as at 18 and this aperture is surrounded by an annular flange 20.

Two members 22 and 24 are retained within the recess and the member 24 bears a peripheral flange 26 which is brazed as at 28 to the exterior surfaces of the tank 10. The member 24 is somewhat cup-shaped and snugly fits within the recess and rests upon the flange 20 as shown in FIGURE 2. It is preferable that the member 24 be brazed to the flange 20 as shown at 30. The central bottom portion of the element 24 is drawn from sheet metal and made as a threaded cylindrical portion 32 open as at 34 (FIGURE 4).

The element 22 is knurled as at 36 and 38 for firm engagement with the fingers in tightening the device as will further appear. An opening 40 is formed in the member 22 and inside the opening is a recess 42 so that the members 22 and 24 present facing annular shoulders for tightly holding a sealing washer 44, a light permeable disc element 46, and an inner sealing washer 48.

When the parts are placed in position on a radiator tank 10 as shown in FIGURE 2, it will be readily appreciated that an excellent view may be had of the level of engine coolant in the tank and in the event that a film or coating of dirt forms on the window or sight glass disc element 46, the element 22 may quickly be detached or removed for gaining access to the element 46 for cleaning and the parts may then be replaced. A channel 50 is defined between the two members 22 and 24 and this channel is open in the plane of the flange 26. The recessed and threaded construction aids in attaching and detaching the member 22 and permits an assembly which is compact with a minimum of protrusion from the tank.

I claim:

A container such as a radiator tank, one vertically extending wall portion of said container being recessed and of relatively thin material, two members retained within said recessed wall portion, one of said members also being of relatively thin material and closely conforming to said recessed wall portion reinforcing the same, means permanently holding said one member to said wall portion in fluid tight relation, a threaded cylindrical portion integral with said one member and extending outwardly, the other of said members being a cylinder with internal threads engaging said threaded cylindrical portion, facing annular shoulders on said members, a light permeable element and a sealing washer interposed between said facing shoulders and located within said other member, and apertures in said wall portion and two members cooperatively arranged to permit viewing of fluid in said container through said light permeable element.

References Cited

UNITED STATES PATENTS

| | | | |
|---|---|---|---|
| 2,594,113 | 4/1952 | Askin | 73—323 X |
| 2,757,831 | 8/1956 | Schmidt. | |
| 2,917,924 | 12/1959 | Messick | 73—334 |
| 3,248,946 | 5/1966 | Lichtenberg et al. | 73—334 |

LOUIS R. PRINCE, *Primary Examiner.*

D. M. YASICH, *Assistant Examiner.*